(12) United States Patent
Ito et al.

(10) Patent No.: US 11,274,993 B2
(45) Date of Patent: Mar. 15, 2022

(54) TIRE TESTING METHOD AND TIRE TESTING DEVICE FOR LOCATING A POSITION ON A TIRE BASED ON A REFERENCE POINT ON THE TIRE AND A ROTATION ORIGIN OF A SPINDLE

(71) Applicant: KOBE STEEL, LTD., Hyogo (JP)

(72) Inventors: Kohei Ito, Takasago (JP); Yasuhiro Matsushita, Takasago (JP); Koji Goto, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 221 days.

(21) Appl. No.: 16/495,798

(22) PCT Filed: Mar. 23, 2018

(86) PCT No.: PCT/JP2018/011669
§ 371 (c)(1),
(2) Date: Sep. 19, 2019

(87) PCT Pub. No.: WO2018/180974
PCT Pub. Date: Oct. 4, 2018

(65) Prior Publication Data
US 2020/0025650 A1    Jan. 23, 2020

(30) Foreign Application Priority Data

Mar. 28, 2017 (JP) .............................. JP2017-062967

(51) Int. Cl.
*G01M 17/02* (2006.01)
*G01M 1/26* (2006.01)
*B60C 13/00* (2006.01)

(52) U.S. Cl.
CPC ......... *G01M 17/021* (2013.01); *B60C 13/001* (2013.01); *G01M 1/26* (2013.01)

(58) Field of Classification Search
CPC ............ B29D 2030/0634; G01M 1/26; G01M 17/024
See application file for complete search history.

(56) References Cited

U.S. PATENT DOCUMENTS

| | | | |
|---|---|---|---|
| 6,417,918 B1 * | 7/2002 | Anno ...................... | G01M 1/02 356/237.1 |
| 2006/0151451 A1 | 7/2006 | Smith Jr. et al. | |
| 2015/0300922 A1 * | 10/2015 | Wakazono .......... | G01M 17/021 73/146 |

OTHER PUBLICATIONS

Notification of Transmittal of Translation of the International Preliminary Report on Patentability (Chapter I) and Translation of Written Opinion of the International Searching Authority, PCT/JP2018/011669 dated Oct. 1, 2019.

* cited by examiner

*Primary Examiner* — Eric S. McCall
*Assistant Examiner* — Timothy P Graves
(74) *Attorney, Agent, or Firm* — Studebaker & Brackett PC

(57) ABSTRACT

A tire testing method includes: applying a lubrication solution to a bead part of a tire; detecting a phase of a reference point of the tire; detecting a phase of a rotation origin of a spindle at common coordinates shared with coordinates at which the phase of the reference point is indicated; detecting a singular point present on the tire by conducting a tire test while rotating the tire on the spindle, and detecting a phase from the rotation origin to the singular point; calculating a phase from the reference point to the singular point based on the phase of the reference point, the phase of the rotation origin, and the phase from the rotation origin to the singular point; storing information about the reference point and information about the rotation origin at the common coordinates; and marking the tire at a position where the singular point is present.

9 Claims, 13 Drawing Sheets

CENTER OF TIRE

METHOD FOR CALCULATING DISTANCE BETWEEN COORDINATES

FIG. 13

| BEAD DIAMETER (inch) | 12 | 13 | 14 | 15 | 16 | 17 | 18 | 19 | 20 |
|---|---|---|---|---|---|---|---|---|---|
| SENSOR POSITION (°) | 33.2 | 36.9 | 40.2 | 43.0 | 45.6 | 47.9 | 49.9 | 51.8 | 53.5 |
| BEAD DIAMETER (inch) | 21 | 22 | 23 | 24 | 25 | 26 | 27 | 28 | |
| SENSOR POSITION (°) | 55.0 | 56.4 | 57.7 | 58.9 | 59.9 | 60.9 | 61.9 | 62.7 | |

TIRE TESTING METHOD AND TIRE TESTING DEVICE FOR LOCATING A POSITION ON A TIRE BASED ON A REFERENCE POINT ON THE TIRE AND A ROTATION ORIGIN OF A SPINDLE

TECHNICAL FIELD

The present invention relates to a tire testing method for marking, on a tire, a singular point detected in a tire test using a tire testing device such as a tire uniformity machine, and a tire testing device therefor.

BACKGROUND ART

A conventional tire testing device such as a tire uniformity machine conducts a tire test such as a tire uniformity test by rotating a tire around a spindle (rotation shaft) extending in an up-down direction. In such a tire test as the tire uniformity test, for example, a part of a tire at which a repulsive force becomes the largest in a circumferential direction, a part of a tire at which a mass becomes the largest in a circumferential direction, or the like is measured as a "singular point". The tire is attached to a wheel using a balance weight or the like in consideration of the singular point. As a result, a comfortable ride can be acquired.

Specifically, in a tire test such as the tire uniformity test, first, for facilitating detachment of a tire, which is already tested, from a spindle provided in a main body unit of the tire testing device, a lubrication solution is applied to an inner surface of the tire in a lubrication unit. Next, the tire sent from the lubrication unit to the main body unit is attached to the spindle. Then, the above singular point is measured by rotating the tire while having a rotation drum in contact with the tire, the rotation drum rotating around an axis extending in an up-down direction.

The tire whose singular point has been measured in the main body unit is conveyed to a marking unit, and a marking of the tire is conducted at a position along a circumferential direction where the singular point is present. This results in impressing the marking indicative of the above singular point on the tire.

In recent years, various kinds of traceability have been demanded related to tires. Therefore, related to the above-described marking of a singular point, it is required to follow up whether or not a marking has been actually impressed on a singular point in a case of an unforeseen situation after manufacturing. In order to meet the requirement, the technique disclosed in Patent Literature 1 has been developed.

The tire inspecting method disclosed in Patent Literature 1 includes: a tire rotation step of rotating a tire by rotation means under a mark detection sensor arranged in a predetermined direction from a rotation center of the rotation means, stopping the rotation when the mark detection sensor detects a mark as a reference point of the tire, and positioning the mark in a predetermined direction from a center of the tire; and a singular point position detecting step of, with the mark being positioned in the predetermined direction from the center of the tire, detecting a position of a singular point of the tire by singular point position detection means as a rotation direction angle with respect to the reference point which is the mark in the predetermined direction.

In the tire inspecting method disclosed in Patent Literature 1, when, with the tire being rotated by the rotation means, the mark detection sensor detects a mark as a reference point of the tire, the rotation of the tire is stopped upon the detection to thereby position the mark in the predetermined direction from the center of the tire. Thus, the tire inspecting method disclosed in Patent Literature 1 needs precise positioning of the mark at a fixed position before detection of a singular point in a tire test, and therefore complicated and expensive parts such as a servo motor needs to be used.

CITATION LIST

Patent Literature

Patent Literature 1: Japanese Patent No. 4540205

SUMMARY OF INVENTION

An object of the present invention is to provide a tire testing method for obtaining a phase from a reference point to a singular point of a tire with high precision by inexpensive means without precisely positioning the reference point of the tire at a fixed position before detection of the singular point in a tire test, and for follow-up of marking of a singular point, and a tire testing device therefor.

A tire testing method according to the present invention includes: a step for applying a lubrication solution to a bead part of a tire provided with a reference point while rotating the tire; a step for detecting a phase of the reference point after application of the lubrication solution; a step for detecting a phase of a rotation origin of a spindle at common coordinates shared with coordinates at which the phase of the reference point is indicated; a step for detecting a singular point present on the tire by conducting a tire test while rotating, on the spindle, the tire to which the lubrication solution has been applied, and detecting a phase from the rotation origin of the spindle to the singular point; a step for calculating a phase from the reference point to the singular point based on the phase of the reference point of the tire, the phase of the rotation origin of the spindle, and the phase from the rotation origin of the spindle to the singular point; a step for storing information about the reference point at the common coordinates and information about the rotation origin at the common coordinates; and a step for marking the tire at a position along a circumferential direction where the singular point is present.

A tire testing device according to the present invention includes: a lubrication unit which applies a lubrication solution to a bead part of a tire provided with a reference point while rotating the tire; a main body unit which detects a singular point present on the tire by conducting a tire test while rotating, on a spindle, the tire to which the lubrication solution has been applied by the lubrication unit; a marking unit which marks the tire at a position along a circumferential direction where the singular point is present; a singular point phase calculating unit; and a storage unit, in which the lubrication unit has a reference point phase detecting unit which detects a phase of the reference point after application of the lubrication solution, the phase of the reference point being a phase at common coordinates which are common to the lubrication unit, the main body unit, and the marking unit, the main body unit has an origin phase detecting unit which detects a phase of a rotation origin of the spindle at the common coordinates, and a singular point phase detecting unit which detects a phase from the rotation origin to the singular point, the singular point phase calculating unit is configured to calculate a phase from the reference point to the singular point based on the phase of the reference point detected by the reference point phase detecting unit, the phase of the rotation origin detected by the origin phase detecting unit, and the phase from the rotation origin to the singular point detected by the singular point phase detecting unit, and the storage unit is configured to store information about the reference point at the common coordinates detected by the reference point phase detecting unit and information about the rotation origin at the common coordinates detected by the origin phase detecting unit.

BRIEF DESCRIPTION OF DRAWINGS

FIG. 13 is a table showing information about a rim transmitted from a computer apparatus to the controller.

DESCRIPTION OF EMBODIMENTS

In the following, an embodiment of a tire testing method and a tire testing device 1 of the present invention will be described in detail with reference to the drawings.

Figure 10:
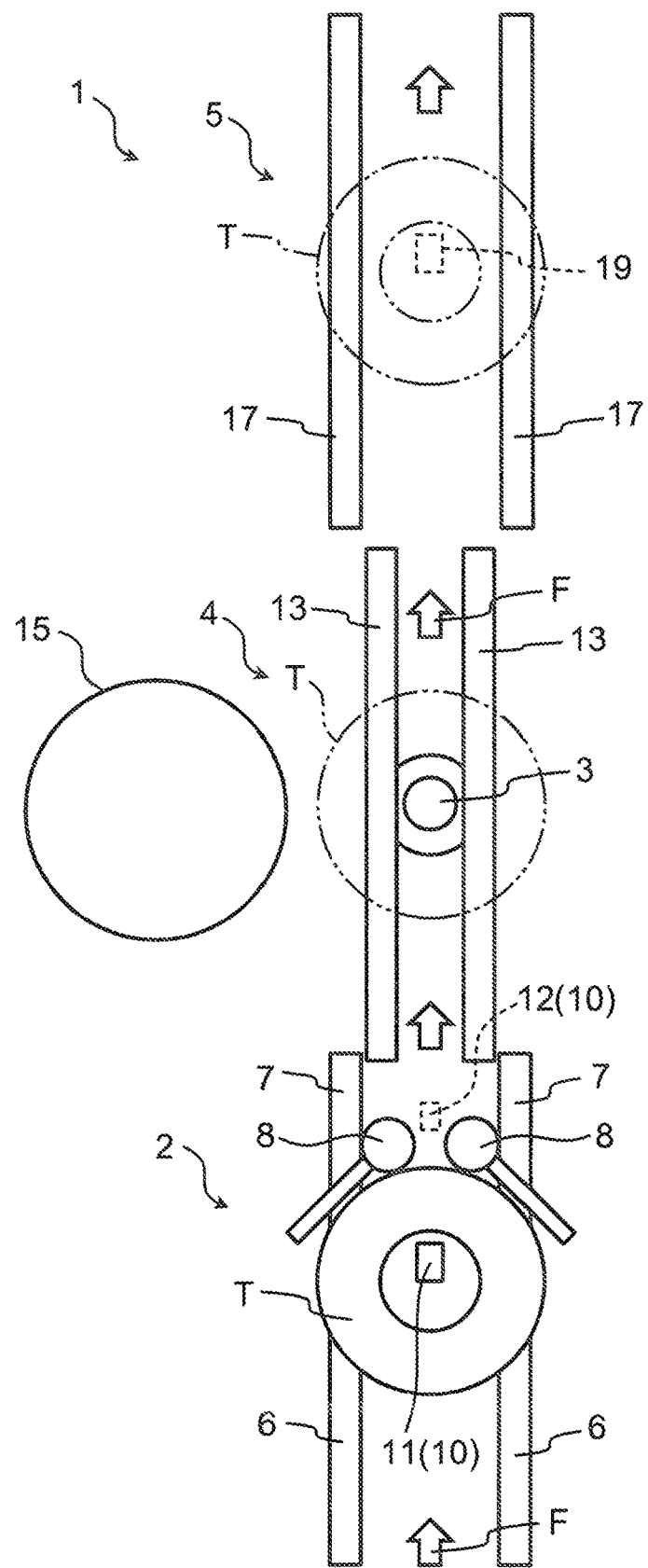
FIG. 10 is a diagram showing an overall configuration of the tire testing device.

FIG. 10 is a diagram schematically showing an overall configuration of the tire testing device 1 of the present embodiment. FIG. 10 shows one example of the tire testing device of the present invention. The tire testing device of the present invention is not limited to the configuration illustrated in FIG. 10.

Figure 2:
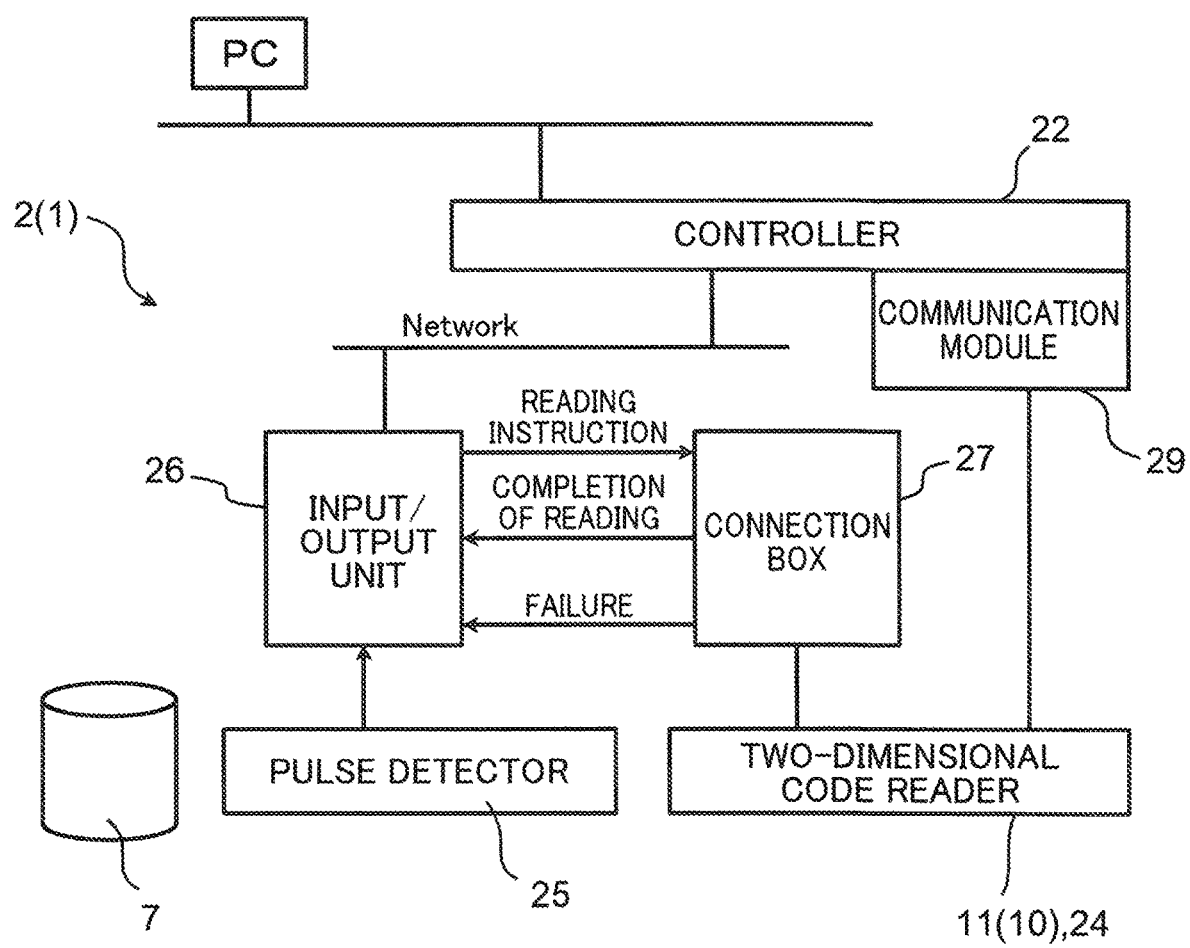
FIG. 2 is a diagram schematically showing a configuration of a controller unit of the tire testing device according to the embodiment.
Figure 3:
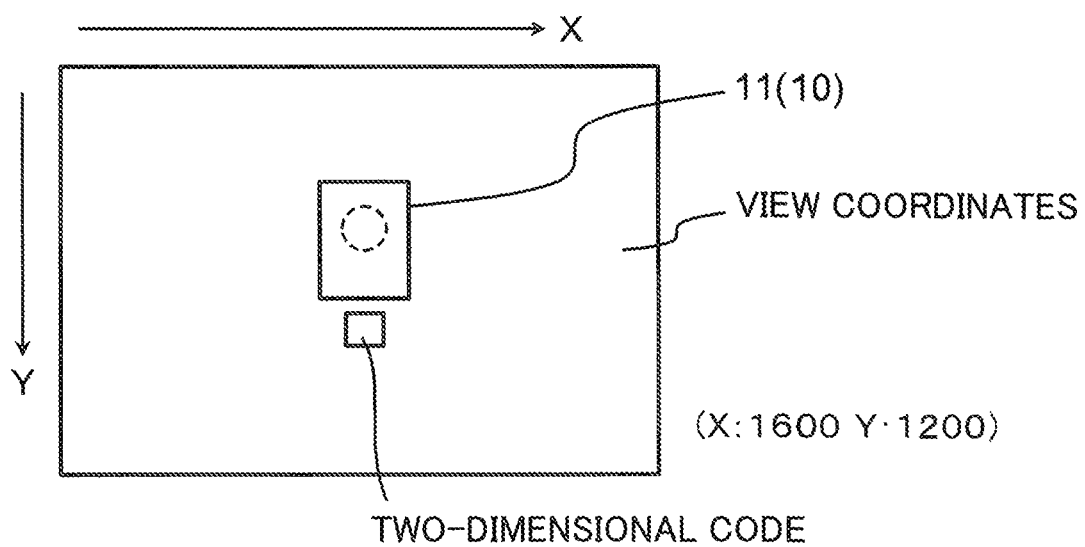
FIG. 3 is a diagram showing view coordinates of a two-dimensional code reader.
Figure 12:
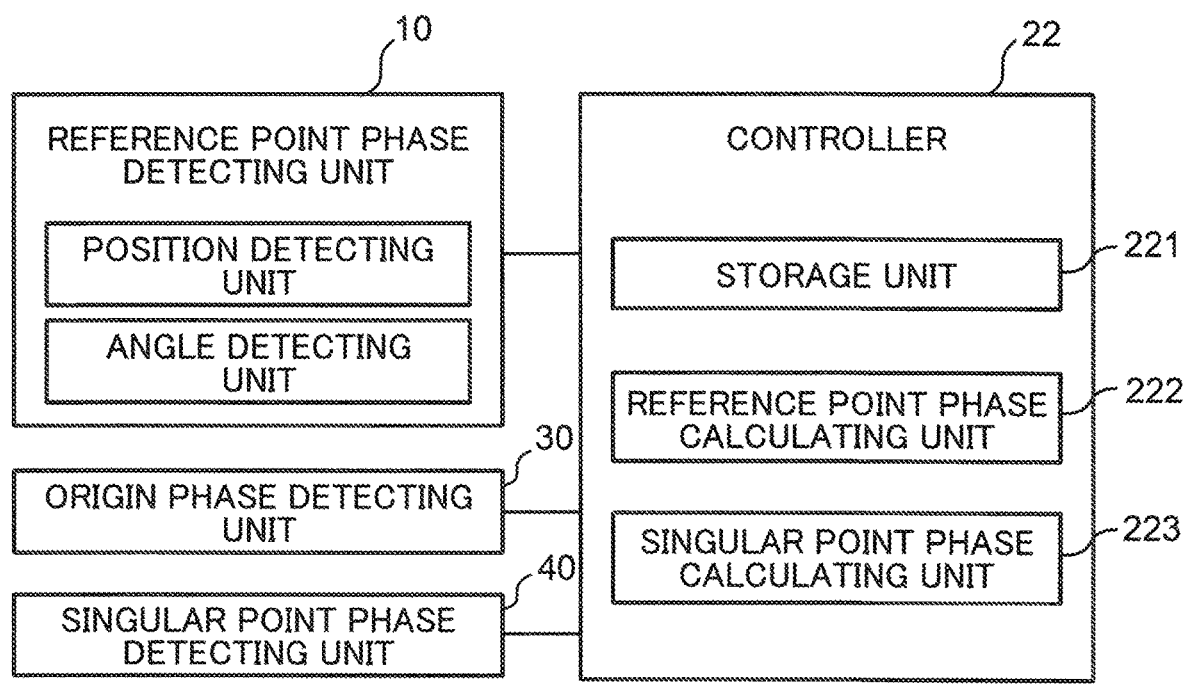
FIG. 12 is a block diagram showing a functional configuration of the tire testing device according to the embodiment.

As shown in FIG. 10, the tire testing device 1 of the present embodiment has a lubrication unit 2, a main body unit 4, a marking unit 5, and a controller 22 (see FIG. 2 and FIG. 12).

The lubrication unit 2 has a function of applying a lubrication solution to a bead part while rotating a tire T. The main body unit 4 has a function of detecting a singular point present on the tire T by conducting a tire test while rotating, on a spindle 3, the tire T to which the lubrication solution has been applied in the lubrication unit 2. The marking unit 5 has a function of marking the tire T at a position along a circumferential direction where a singular point is present.

The lubrication unit 2, the main body unit 4, and the marking unit 5 are sequentially arranged along a tire conveyance direction F in the tire testing device 1.

The controller 22 controls operation of the lubrication unit 2, the main body unit 4, and the marking unit 5.

[Lubrication Unit]

The lubrication unit 2 applies a lubrication solution to the tire T carried in by the tire testing device 1 as described above. The lubrication unit 2 of the tire testing device 1 of the present embodiment also has a function of detecting a reference point (e.g. a two-dimensional code) provided on the tire T.

Figure 1:
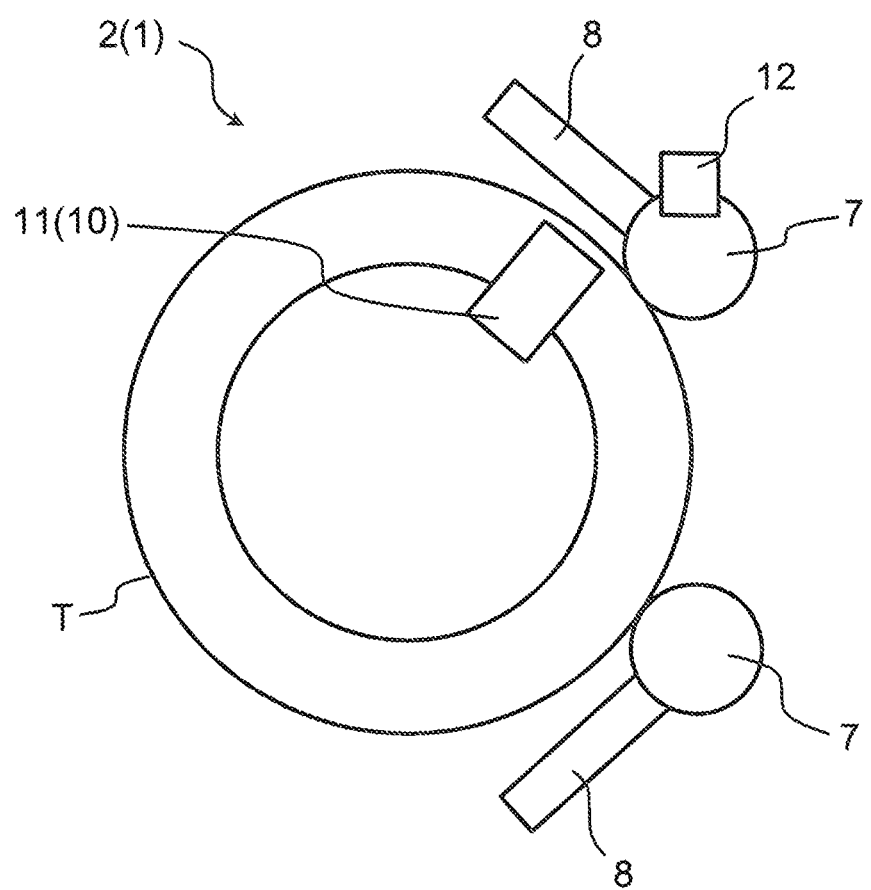
FIG. 1 is a diagram schematically showing a configuration of a lubrication unit of a tire testing device according to an embodiment.

As shown in FIG. 1 and FIG. 10, the lubrication unit 2 has a pair of conveyors 6, a pair of long arms 8, and a pair of rotational rollers 7. The tire T is carried into the pair of conveyors 6. The pair of conveyors 6 is configured to be capable of conveying the tire T arranged horizontally such that a direction of a rotation axis of the tire T faces to a vertical direction.

The pair of arms 8 holds the tire T at a predetermined position of the lubrication unit 2. Each arm 8 is configured to be pivotable, on a base end portion thereof, around a pivot facing to an up-down direction, the base end portion being positioned on a radially outer side of the tire T.

Each rotational roller 7 is attached to a front end of the corresponding arm 8. Specifically, each rotational roller 7 is configured to be rotatable, at the front end of the corresponding arm 8, around a rotation axis facing to the up-down direction relative to the arm 8. Therefore, in a state of being in contact with an outer circumferential surface of the tire T, each rotational roller 7 does not hinder rotation of the tire T around the axis facing to the up-down direction. Each rotational roller 7 is allowed to come into contact with the outer circumferential surface of the tire T or be spaced apart from the outer circumferential surface of the tire T as a result of pivoting of the corresponding the arm 8.

The lubrication unit 2 further has an application unit not shown. The application unit is configured to be movable from a position below the conveyor 6 to a position above the conveyor 6. The application unit is provided for applying a lubrication solution to the bead part (inner circumferential part) of the tire T. The application unit is a brush-shaped member facing to the up-down direction and has a structure for applying a lubrication solution to an inner circumferential surface of the tire T. The application unit goes up and down in the up-down direction to contact the bead part of the tire T for the application of a lubrication solution.

The lubrication unit 2 further has free rollers not shown. The tire T is supported by the free rollers so as to be rotatable while being horizontally arranged on the free rollers. In other words, at the time of applying a lubrication solution to the tire 2 in the lubrication unit 2, the tire 2 is rotated with its lower surface supported by the free rollers, its outer circumferential surface supported by the two arms 8, and its bead part supported by the application unit (brush) of the lubrication unit 2.

A shown in FIG. 1, FIG. 10, and FIG. 12, the lubrication unit 2 is provided with a reference point phase detecting unit 10. The reference point phase detecting unit 10 detects a position of a reference point of the tire T in the circumferential direction, i.e. detects a phase of a reference point of the tire T. The reference point detected by the reference point phase detecting unit 10 is a reference for specifying a position of a singular point of the tire T in the circumferential direction. In the present embodiment, the reference point is formed of a two-dimensional code.

Specifically, the reference point phase detecting unit 10 in the present embodiment is provided with a position detecting unit and an angle detecting unit. The position detecting unit detects a position of the reference point of the tire T. The angle detecting unit measures an angle of rotation of the tire T after a position of the reference point is detected by the position detecting unit. In the present embodiment, the position detecting unit is configured with a two-dimensional code reader 11 and the angle detecting unit is configured with a pulse detector 12. The two-dimensional code reader 11 is configured to be capable of reading a two-dimensional code of the tire T carried into the lubrication unit 2. The pulse detector 12 is configured to be capable of detecting how much a two-dimensional code has rotated in the circumferential direction of the tire T during application of a lubrication solution.

Since a two-dimensional code used as a reference point in the present embodiment is widely used in tires T manufactured in these days as a tag on which a lot number or a part of manufacturing records is impressed, the two-dimensional code can be used as a reference of a singular point regardless of a manufacturer and a kind. The reference point need only be capable of detecting a position in a circumferential direction using an optical sensor or the like, and may be, for example, an uneven structure or an impress provided in a side wall part or a bead part of the tire T.

The two-dimensional code reader 11 detects a two-dimensional code by optically imaging a surface of the tire T, and has a view area far larger than that of the two-dimensional code. The two-dimensional code reader 11 shown in FIG. 4 has 1600 pixels in an X direction and 1200 pixels in a Y direction in its field of view.

The pulse detector 12 is configured with an optical detection device. In the present embodiment, the pulse detector 12 is provided at the rotational roller 7 provided at the front end of the arm 8, and is configured to be capable of detecting the number of rotations and a rotation angle of the rotational roller 7.

The pulse detector 12 can detect a rotation angle of the tire T from which a two-dimensional code has been detected by the two-dimensional code reader 11. In other words, the pulse detector 12 can detect a rotation angle of a two-dimensional code rotating after detection of the two-dimensional code until the tire T stops which have been applied a lubrication solution while rotating.

Then, the reference point phase detecting unit 10 can obtain a phase of a reference point at a time point of carry-out from the lubrication unit 2 by combining a phase of a two-dimensional code detected by the two-dimensional code reader 11 and a rotation angle of the two-dimensional code on the tire T rotating during application of the lubrication solution. Thus obtained phase of the reference point is sent to the controller 22 to be described later.

Figure 11:
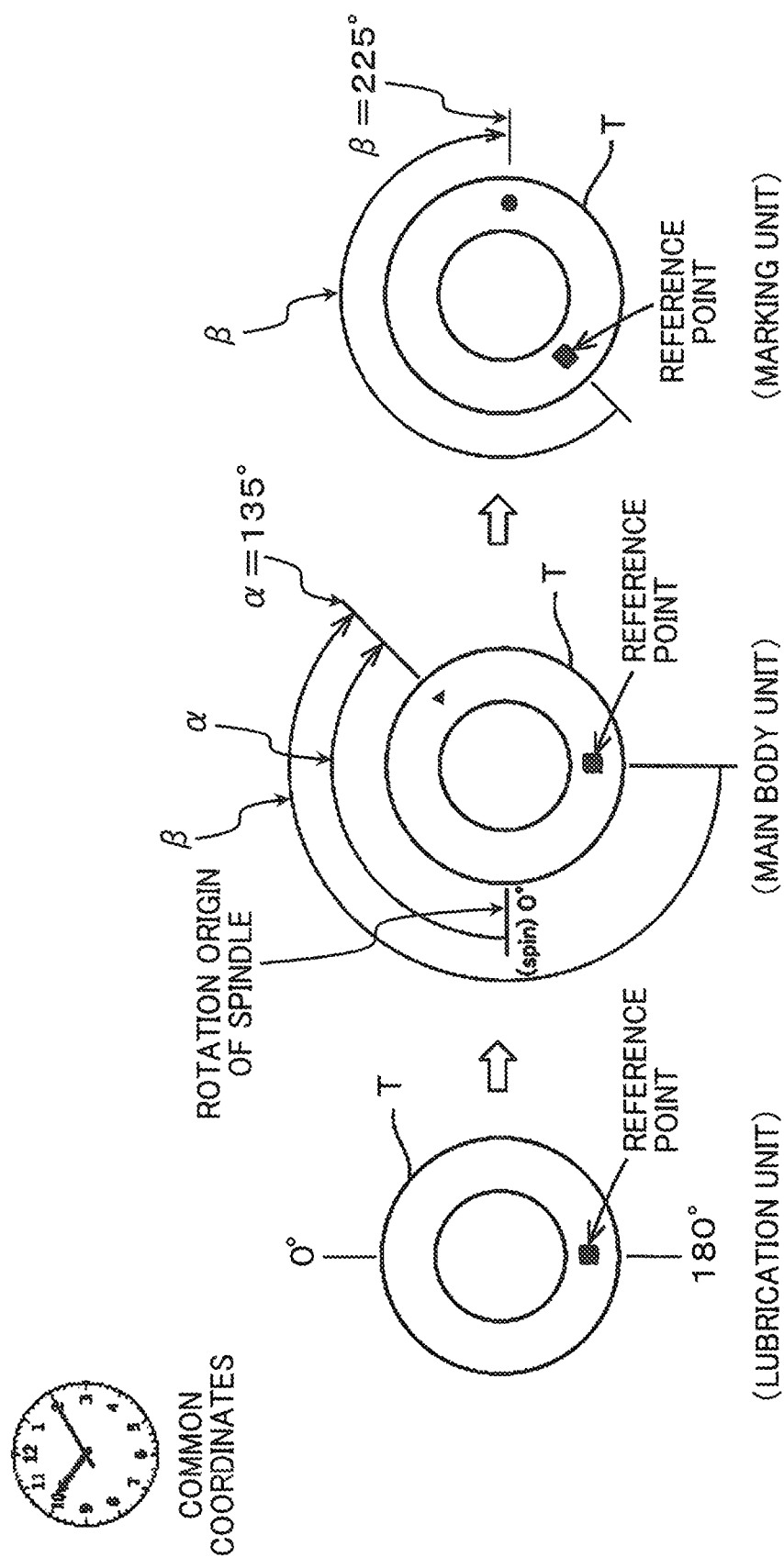
FIG. 11 is a diagram showing a positional relationship among a reference point, a rotation origin, and a singular point in each of the lubrication unit, a main body unit, and a marking unit.

In a specific example shown in FIG. 11, a two-dimensional code as a reference point is present at a position of 180° at common coordinates. In other words, an angle formed by a straight line linking a reference (origin) at the common coordinates and the rotation axis of the tire T (center of the tire T) and a straight line linking the two-dimensional code as a reference point and the rotation axis of the tire T is 180°.

Here, common coordinates are coordinates common to the lubrication unit 2, the main body unit 4, and the marking unit 5. In other words, the common coordinates are coordinates used in common in the entire tire testing device 1. In the specific example shown in FIG. 11, the reference (origin) is at a position of "12 o'clock" on the common coordinates.

Accordingly, as shown in the left drawing of FIG. 11, a vector directed from the center of the tire T to the two-dimensional code as a reference point faces to the direction of 6 o'clock.

A time period when the rotational roller 7 is rotated during application of a lubrication solution may be time until detection of a two-dimensional code by the two-dimensional code reader 11 or until arrival of a limit time determined in advance.

It is also possible to take in basic information of a diameter and a width direction of the tire T to be checked from information of the two-dimensional code detected by the two-dimensional code reader 11 and increase a detection precision of a position of a reference point present in the tire T by using the taken in basic information.

The tire T to which the lubrication solution is applied by the lubrication unit 2 is sent from the lubrication unit 2 to the main body unit 4.

[Main Body Unit]

The main body unit 4 is provided with the spindle 3, a rotation driving unit not shown, a drum 15, transfer means 13, and a load cell not shown.

The spindle 3 holds the tire T so as to allow the tire T to rotate around its axis facing to the up-down direction. The spindle 3 is a rod-shaped member configured to be rotatable around the axis facing to the up-down direction, and is provided with a rim (not shown) which sandwiches the tire T in the up-down direction.

The rotation driving unit drives to rotate the spindle 3 via a belt not shown.

The drum 15 is a tubular member arranged radially outer side of the spindle 3 and configured to be rotatable around an axis facing to the up-down direction. The drum 15 is configured to be horizontally movable and has an outer circumferential surface which can come into contact with the outer circumferential surface of the tire T attached to the spindle 3 or can be spaced apart from the tire T.

The transfer means 13 has a pair of belt conveyors which conveys the tire T.

The load cell is provided, for example, at a rotation shaft of the drum 15. The load cell is capable of measuring force or moment applied to the drum 15 from the tire T during rotation. The tire testing device 1 is configured to be capable of measuring tire uniformity and the like based on a measurement result of the force or moment obtained by the load cell.

In the main body unit 4, a plurality of tire tests is sequentially conducted with respect to a plurality of tires T. In the main body unit 4, a rotation origin of the spindle 3 is not adjusted to a fixed position set in advance at the completion of each tire test. In other words, at the completion of each tire test, the rotation origin of the spindle 3 can assume various directions relative to a rotation axis of the spindle 3. In the specific example shown in FIG. 11, in a tire test immediately preceding the present tire test, a vector directed from the center of the tire T toward the rotation origin of the spindle 3 faces to a direction of "9 o'clock". The rotation origin of the spindle 3 is present at a position of 270° at the common coordinates.

As shown in FIG. 12, the main body unit 4 is further provided with an origin phase detecting unit 30 and a singular point phase detecting unit 40.

The origin phase detecting unit 30 detects a phase of the rotation origin of the spindle 3 at the common coordinates. The origin phase detecting unit 30 is configured to detect in which direction, the rotation origin of the spindle 3 is positioned seen from an axis of the spindle 3 (the rotation axis of the tire T). The origin phase detecting unit 30 is formed of, for example, a rotary encoder not shown which is provided in the spindle 3.

The singular point phase detecting unit 40 measures various kinds of characteristic values of a tire required for calculating a phase from the rotation origin of the spindle 3 to a singular point of the tire. Specifically, in the main body unit 4, tire repulsive force, deflection, and the like necessary for calculating a phase of a singular point are measured to calculate a phase of a singular point using its measurement result. A repulsive force of the tire is measured by, for example, a strain gage, a moment measurement device, or the like. Deflection of the tire is measured by, for example, a position measure sensor such as a laser sensor. For making information obtained from these measurement results correspond to a rotation angle of the tire T, the rotation angle of the tire T is measured by a rotary encoder or a pulse counter. Accordingly, the singular point phase detecting unit 40 is configured with a sensor for use in measuring the above-described various kinds of characteristic values of the tire T.

A singular point phase calculating unit 223 in the controller 22 to be described later calculates a phase from a rotation origin of the spindle 3 to a singular point of the tire by using a measurement result of various kinds of characteristic values of the tire measured by the singular point phase detecting unit 40.

As a result of execution of such a tire test in the main body unit 4 as described above, a position in the circumferential direction in which a repulsive force of the tire T becomes the largest or a position at which a mass becomes the largest is measured as a "singular point". The main body unit 4 is configured to rotate the tire T from which a singular point is detected such that a position of a singular point calculated by the singular point phase calculating unit 223 coincides with a position of an impressing unit 19 in the marking unit 5, and to carry out the tire from the main body unit 4 to the marking unit 5.

The tire test conducted in the main body unit 4 includes not only the above-described tire uniformity test but also outer-shape measurement and dynamic balance measurement. In a case, for example, where measurement of an outer shape is conducted in the main body unit 4, there is provided a member which measures an outer shape of a tire using laser and the like.

[Marking Unit]

The marking unit 5 conducts marking, on the tire T, of a position of a "singular point" obtained in the tire test conducted in the above-described main body unit 4. In a case, for example, where a tire test of tire uniformity is conducted in the main body unit 4, a uniformity mark is marked, in the marking unit 5, as a singular point at a position in the circumferential direction of the tire T having singularity in tire uniformity. In a case of measurement of an outer shape or a dynamic balance, a mark other than a uniformity mark may be marked.

Specifically, the marking unit 5 is provided with a pair of conveyor belts 17 and the impressing unit 19. Similarly to the lubrication unit 2, the pair of conveyor belts 17 is capable of conveying the tire T in a horizontal position such that the direction of the rotation axis of the tire T faces to the vertical direction. The impressing unit 19 conducts marking at a predetermined position on an inner circumferential side of the tire T positioned on the conveyor belt 17. Positioning of the tire T in this marking is conducted by, for example, controlling movement of the pair of conveyor belts 17 by a servo motor.

[Controller]

As shown in FIG. 12, the controller 22 is provided with a storage unit 221, a reference point phase calculating unit 222, and the singular point phase calculating unit 223.

The storage unit 221 stores information about a reference point at the common coordinates detected by the reference point phase detecting unit 10 and information about a rotation origin at the common coordinates detected by the origin phase detecting unit 30.

In a case of the specific example shown in FIG. 11, the storage unit 221 stores information about traceability of the tire T based on "$\beta-\alpha=90°$", which is a difference between a phase of a reference point at the common coordinates detected by the reference point phase detecting unit 10 in the lubrication unit 2 and a phase of a rotation origin at the common coordinates detected by the origin phase detecting unit 30 in the main body unit 4. Examples of the traceability information include "In the present tire testing device 1, a singular point is present at a position 135° from the rotation origin of the spindle 3, and marking has been conducted at the position. The marking position corresponds to a position 225° from a two-dimensional code (reference point)".

The reference point phase calculating unit 222 calculates a phase of a reference point of the tire T after application of a lubrication solution. Specifically, the reference point phase calculating unit 222 is configured to calculate a phase of a reference point of the tire T after application of a lubrication solution based on a position of the reference point of the tire T at the common coordinates detected by the position detecting unit during the application of the lubrication solution and a rotation angle of the tire T detected by the angle detecting unit during the application of the lubrication solution.

The singular point phase calculating unit 223 calculates a phase from the reference point to the singular point based on a phase of the reference point detected by the reference point phase detecting unit 10, a phase of the rotation origin detected by the origin phase detecting unit 30, and a phase from the rotation origin to the singular point detected by the singular point phase detecting unit 40.

According to the tire testing method and the tire testing device 1 of the present embodiment as described above, a phase from a reference point of the tire T to a singular point can be obtained with high precision and with inexpensive means without precisely positioning a reference point of the tire T at a fixed position before detection of a singular point in a tire test, and also marking made at the singular point can be followed up.

More detailed description will be made of features related to traceability in the present embodiment in the following. For ensuring traceability, first, it is essential that a marking position relative to a reference point coincides with a position of a singular point detected by the main body unit 4. Specifically, as shown in FIG. 11, it is essential that positions are "the same position", the position being indicated in an actual tire T by a phase $\beta$ from a two-dimensional code as a reference point at the tire T to a marking position and the position being indicated by a phase $\alpha$ detected by the main body unit 4 of the tire testing device 1 in the tire test. When marking is conducted to indicate the same position, the tire testing device 1 and the tire testing method can be considered to have truly excellent traceability.

Here, in the specific example shown in FIG. 11, information clarified in a tire test by the tire testing device 1 and information clarified by an actual tire T include the following two points.

(1) Information Obtained from Tire Test in Main Body Unit 4

A singular point is present at a position 135° from the rotation origin (the phase α from a rotation origin to a singular point, α=135°).

(2) Information Obtained when Actually Measuring Tire T

A singular point is present at a position 225° from a two-dimensional code (reference point) (the phase β from a reference point to a singular point, β=225°).

Then, when verifying the tire T, i.e., when confirming traceability, just the above-described information (1) and information (2) are not enough. In other words, in a case where the information (1) and the information (2) are independent from each other and are not correlated with each other, it is unknown whether a marking position relative to the reference point coincides with a position of a singular point obtained in the tire test by the main body unit 4, i.e., with the position of the singular point relative to the rotation origin.

Then, in the tire testing device 1 according to the present embodiment, for allowing a phase of a two-dimensional code (reference point) detected in the lubrication unit 2 and a phase of the rotation origin of the spindle 3 detected in the main body unit 4 to be indicated at the common coordinates, the reference point phase detecting unit 10 and the origin phase detecting unit 30 detect these phases, respectively. Then, the reference point phase detecting unit 10 and the origin phase detecting unit 30 output information about the detected phases to the controller 22 via a network or the like and the storage unit 221 of the controller 22 stores these information. Accordingly, the controller 22 can correlate the above-described information (1) and information (2) based on a difference (β−α=90°) between the phase of the two-dimensional code (the phase at the common coordinates) and the phase of the rotation origin (the phase at the common coordinates).

This arrangement enables the controller 22 to retain information indispensable for traceability as a history and if necessary, to output the information to the outside. Specifically, as a history, the controller 22 can retain information indispensable for traceability, for example, "Since a singular point is present at a position from 135° from the rotation origin of the spindle 3, marking has been conducted at the position. This marking position corresponds to a position from 225° from the two-dimensional code (reference point)".

A further specific example will be described. As shown in FIG. 11, in the lubrication unit 2, first, the reference point phase detecting unit 10 (bar code reader) reads a phase (angle position) of a two-dimensional code of the tire.

The tire T from which the reference point has been thus read is applied a lubrication solution while being rotated in the lubrication unit 2. A phase of a reference point at a time point of completion of the application of a lubrication solution involving such rotation of the tire T is represented as follows in the specific example shown in the left drawing of FIG. 11. Specifically, at a time point of completion of the application, the reference point is present at a position of 180° at the common coordinates and a vector directed from the center of the tire T toward the reference point faces to the direction of "6 o'clock". In other words, a straight line linking a reference (origin) at the common coordinates and the rotation axis of the tire T and a straight line linking the reference point (two-dimensional code) and the rotation axis of the tire T form an angle of 180°.

On the other hand, as illustrated in the specific example shown in the central drawing of FIG. 11, after a tire test immediately preceding the present tire test, in the main body unit 4, a vector directed from the center of the tire T toward the rotation origin of the spindle 3 faces to a direction of "9 o'clock". In other words, the rotation origin of the spindle 3 is present at a position of 270° at the common coordinates. Further in other words, the straight line linking the reference (origin) at the common coordinates and the rotation axis of the tire T and a straight line linking the rotation origin of the spindle 3 and the rotation axis of the tire T form an angle of 270°.

The spindle 3 in this state is attached the tire T carried in from the lubrication unit 2 and is rotated around an axis facing to the up-down direction to measure tire uniformity and the like in the tire test. Then, in the main body unit 4, a phase of a singular point is calculated based on a measurement result of thus measured tire uniformity and the like (α=135°).

At this time, the phase of the singular point (angle position) calculated in the main body unit 4 is merely the phase α from the rotation origin of the spindle 3, and marking is conducted at this position in the marking unit 5. In other words, with only the information from the main body unit 4, it is not possible to grasp information about how much rotation from a reference point such as a two-dimensional code is required to reach a position (β) at which a singular point is present.

Therefore, in the tire testing device 1 of the present embodiment, information "β−α=90°" necessary for traceability is transferred to the controller 22 via the network or the like. As a result, in the tire testing device 1, based on the above information, information based on the tire can be obtained that "A singular point is present at a position of 135° from the rotation origin of the spindle 3 and marking has been conducted at that position. The marking position corresponds to a position 225° from the two-dimensional code (reference point)".

In the tire testing device 1 of the present embodiment described in the foregoing, a phase from a reference point of the tire T to a singular point can be obtained with high precision and with inexpensive means without precisely positioning a reference point of the tire T at a fixed position before detection of a singular point in a tire test, and also marking made at the singular point can be followed up.

Further, the present embodiment attains remarkable functions and effects as follows.

[1] Since a phase from a reference point to a singular point position is calculated without stopping operation of a rotation mechanism (the rotation driving unit) involving positioning operation, processing with respect to the controller 22 which controls the rotation mechanism is simplified.

[2] A marking position can be read with high precision from image data picked up by the bar code reader (the reference point phase detecting unit), and a phase from a reference point to a singular point position can be calculated with high precision.

[3] Since a rotation mechanism not provided with a positioning function can be used, the rotation mechanism can be realized with an inexpensive configuration.

[4] Since a phase of a reference point is specified in the lubrication unit 2, it is not necessary to detect a phase of a reference point in the main body unit 4. Accordingly, the main body unit 4 needs no reference point phase detecting unit to be arranged. In the main body unit 4, the above-described singular point phase detecting unit (various kinds of sensors which measure the above-described various kinds of characteristic values of the tire T) need only be arranged.

[5] Since a position of a reference point is detected during lubrication operation as indispensable operation in the tire testing device and a phase of the reference point can be specified at the completion of the lubrication operation, it is not necessary to provide separate steps for detecting a position of the reference point and detecting a phase of the reference point, so that the reference point phase detection does not affect a tire test time.

In the tire testing device 1 according to the present embodiment described in the foregoing, a two-dimensional code is used as a reference point. In this case, a reference point position can be obtained with improved precision by subjecting various corrections.

In the following, a tire testing method according to one embodiment of the present invention will be described with reference to the flow chart shown in FIG. 9 and also a method for correcting a phase of a two-dimensional code will be described with reference to FIG. 5 to FIG. 8 and the like.

Figure 9:
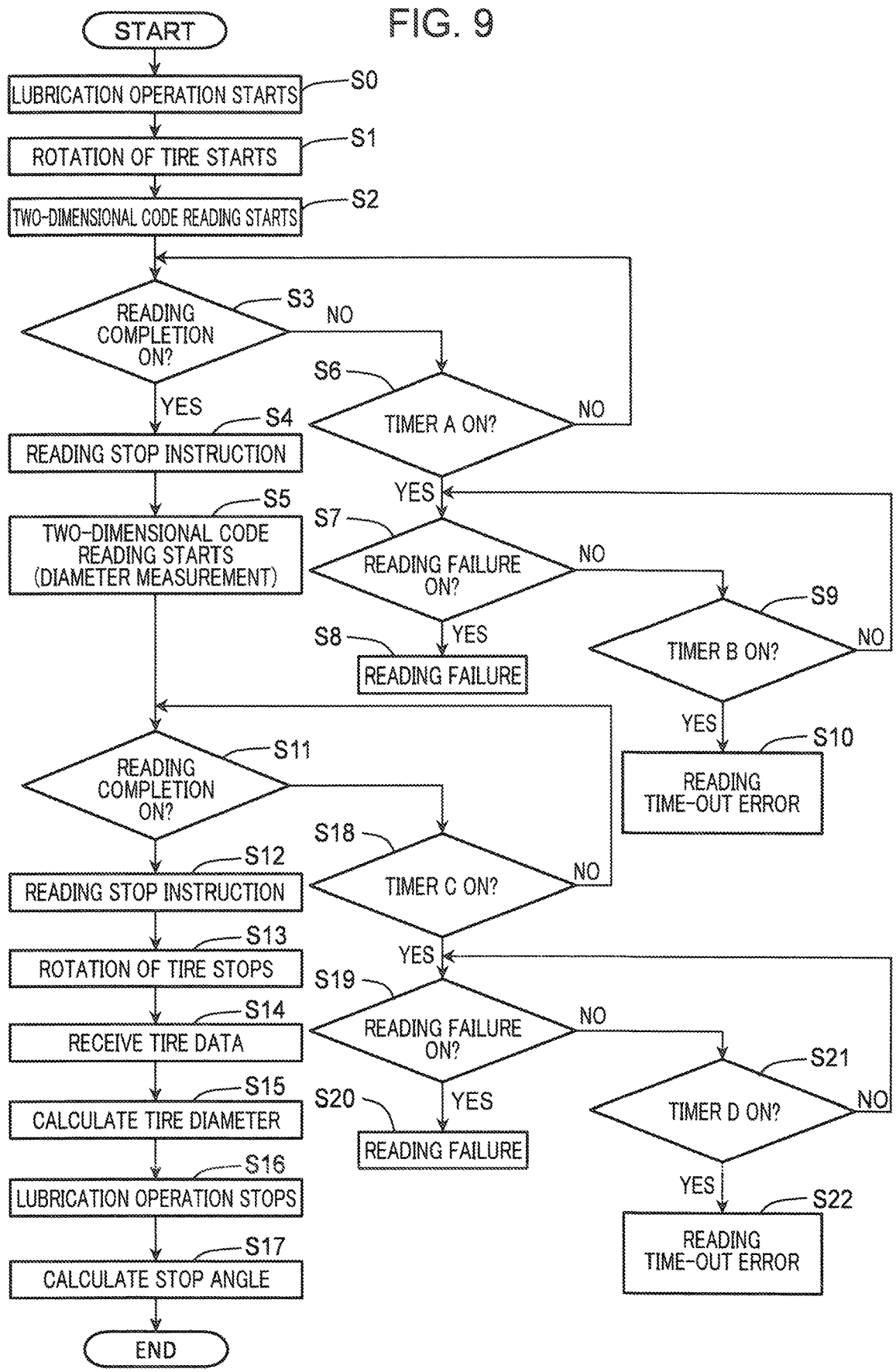
FIG. 9 is a flow chart showing a procedure of a tire testing method according to the embodiment.

As shown in FIG. 9, the controller 22 controls the lubrication unit 2 such that lubrication operation starts (Step S0 in FIG. 9). The controller 22 controls the rotational roller 7 such that rotation of the tire T starts (Step S1).

Specifically, the arm 8 with the rotational roller 7 attached to its front end side is horizontally swung to press the rotational roller 7 positioned at the front end side of the arm 8 against the outer circumferential surface of the tire T. When the rotation of the rotational roller 7 starts, a gear of a pulse detector 25 fit in the rotational roller 7 is also rotated to turn on/off the pulse detector 25. A pulse signal being turned on/off by the pulse detector 25 is sent to the controller 22 via an input/output unit 26 and counted by the controller 22. Data with a count number C is stored in the controller 22.

Next, the controller 22 transmits an instruction to start reading of a two-dimensional code to a two-dimensional code reader 24 (Step S2). The reading instruction from the controller 22 is transmitted to the two-dimensional code reader 24 via the input/output unit 26 and a connection box 27. At this time, data such as coordinates data and code information stored in the controller 22 is reset.

In a case where a two-dimensional code is read in the two-dimensional code reader 24 (YES in Step S3), the two-dimensional code reader 24 transmits the read information to the controller 22. Specifically, signals such as two-dimensional code position information (e.g. detection coordinates (Xb, Yb)) read by the two-dimensional code reader 24, decoding time Tb, and character string information obtained by decoding a two-dimensional code are transmitted to the controller 22 from the two-dimensional code reader 24 via a communication module 29.

On the other hand, in a case where the two-dimensional code reader 24 cannot normally read a two-dimensional code, the two-dimensional code reader conducts processing shown in Steps S6 to S10 so as to normally read a two-dimensional code and tries reading. Specifically, the processing is as follows.

Time from reading start is measured by a timer A and a timer B. In a case where a two-dimensional code can be read within a predetermined time of the timer A and a reading result is false (YES in Step S7), the two-dimensional code reader 24 outputs a reading failure signal to the controller 22 (Step S8). In a case where a two-dimensional code cannot be read within the predetermined time and a predetermined time of the timer B has elapsed (YES in Step S9), the two-dimensional code reader 24 outputs a reading time-out error signal to the controller 22 (Step S10). In either case, the controller 22 conducts such control as to stop the lubrication operation and stop the tire test.

When receiving the reading result from the two-dimensional code reader 24, the controller 22 transmits an instruction to stop reading of a two-dimensional code to the two-dimensional code reader 24 (Step S4).

The controller 22 also transmits character string information of a two-dimensional code to a computer apparatus such as an external personal computer (PC) (see FIG. 2). A character string obtained by decoding a two-dimensional code is a sign indicative of, for example, tire standards. Transmission of the above character string to the computer apparatus results in sending information such as a tire diameter (Dt), a tire width (Dw), and a rim diameter (Db) from the computer apparatus to the controller 22 (Step S14 to be described later).

Next, the controller 22 again transmits the two-dimensional code reading start instruction to the two-dimensional code reader 24 (Step S5). The instruction is the second reading start instruction. In Steps S11, and S18 to S22, the same processing as the above-described processing in Steps S3 and S6 to S10 is conducted.

Upon receiving a reading result from the two-dimensional code reader 24, the controller 22 transmits a two-dimensional code reading stop instruction to the two-dimensional code reader 24 (Step S12). Since at this time point, reading of the two-dimensional code and the application of a lubrication solution have been completed, the controller 22 controls the rotational roller 7 such that the rotation of the tire T stops (Step S13).

The computer apparatus such as an external personal computer outputs the tire information such as the tire diameter (Dt), the tire width (Dw), and the rim diameter (Db) to the controller 22, and the controller 22 receives the tire information (Step S14).

After the rotation of the tire T stops, a signal indicative of stop of the tire T is transmitted from the reference point phase detecting unit 10 to the controller 22. The controller 22 calculates the diameter of the tire T (Step S15).

The controller 22 controls the lubrication unit 2 so as to stop the lubrication operation (Step S16) and calculates a stop angle (Step S17). The tire testing method according to the present embodiment is executed in the manner described in the foregoing. Specific description will be made of calculation of the diameter of the tire T, calculation of the stop angle, and the like in the following.

Calculation of the diameter of the tire T is conducted according to a procedure set forth below.

Figure 4:
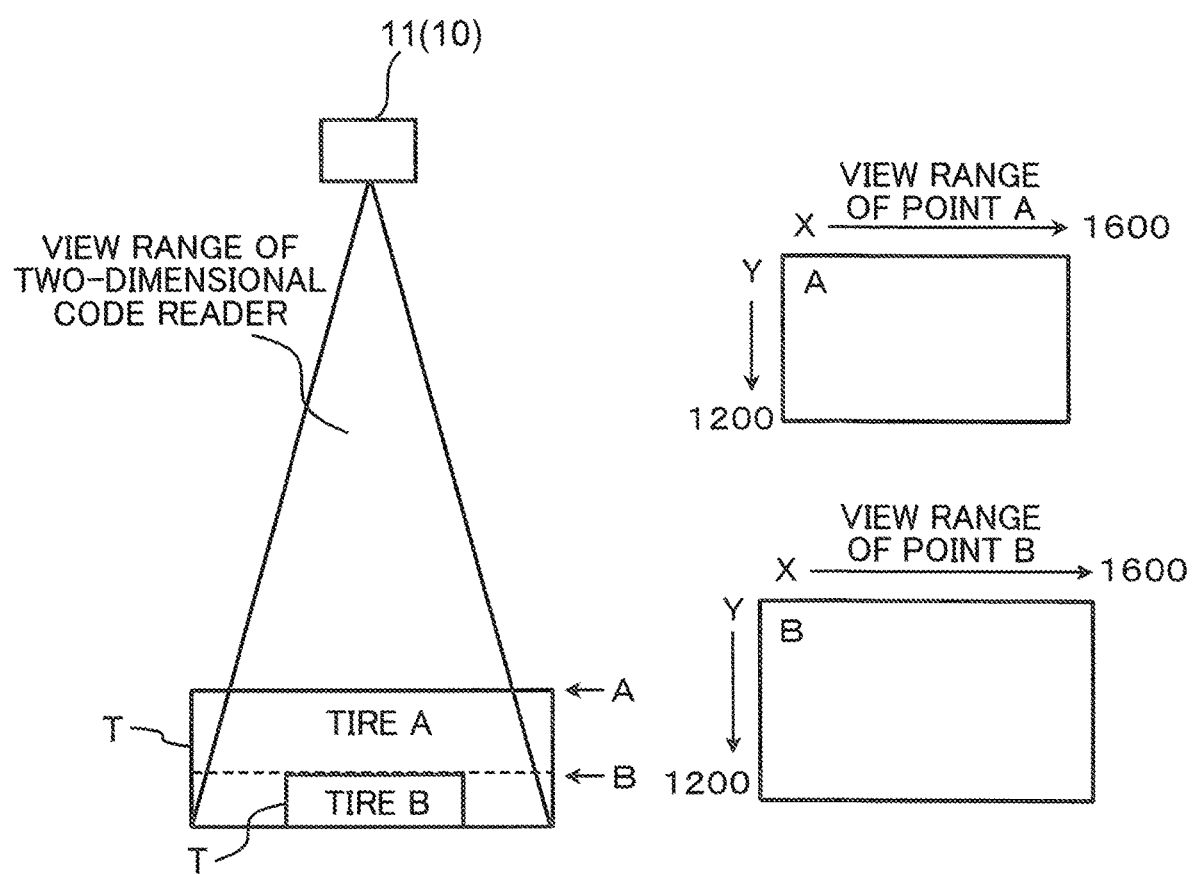
FIG. 4 is a diagram showing a method for correcting a view range according to a reading height of the two-dimensional code reader.

First, a coefficient for converting a pixel to a length (mm) is calculated following the procedure shown in FIG. 4. Specifically, a width of a tire T to be tested changes with a change of a type of the tire T, which is followed by a change of a view range (length) that can be optically observed by the two-dimensional code reader 24. Therefore, a length (mm) per one pixel (pix) can be calculated using the tire information such as the tire diameter (Dt), the tire width (Dw), and the rim diameter (Db) sent from the computer apparatus to the controller 22.

A detectable range of the code reader 24 is defined using three direction of a width direction X of view, a length direction Y of view, and a height direction Z of view. A length Zw, in the height direction Z of view, of the detectable range of the code reader 24 is defined by $Zw=(Zs-Zc)$ in which a readable distance that is the closest to the code reader 24 is represented as $Zc$ and a readable distance that is the farthest from the code reader is represented as $Zs$.

Assuming that the distance Zs is 1048.3 mm, that an optimum position for detection within the detectable range of the code reader 24 in the direction Z is, for example, Zc+(Zw/2)=810.0 mm, that a length, at the optimum position, of the view range in the direction X is 222.5 mm, and that a length of the view range in the direction Y is 170.0 mm, a conversion coefficient in the direction X and a conversion coefficient in the direction Y are represented by Formula (1) and Formula (2) shown below.

The code reader 24 is installed such that the position of the Zs coincides with a bottom surface of the tire.

Conversion coefficient $Xp=((222.5 \text{ (mm)} \div 810.0 \text{ (mm)}) \times (1048.3 \text{ (mm)} - Dw \text{ (mm)})) \div 1600$ (pix)    (1)

Conversion coefficient $Yp=((170.0 \text{ (mm)} \div 810.0 \text{ (mm)}) \times (1048.3 \text{ (mm)} - Dw \text{ (mm)})) \div 1200$ (pix)    (2)

Using the conversion coefficients Xp and Yp obtained by the above-described procedure, an inter-two-point coordinate distance Lbcr_RD between a point a (Xa, Ya) and a point b (Xb, Yb) indicated in the number of pixels can be obtained in a manner shown in Formula (3) below.

$Lbcr\_RD=\sqrt{[\{(Xa-Xb) \times Xp\}^2+\{(Ya-Yb) \times Yp\}^2]}$    (3)

Next, approximating the inter-two-point distance obtained by Formula (3) to a circular arc centered around the center of the tire T, an inter-two-point coordinate angle between the point a and the point b ($\theta bcr\_RD$ (deg)) is obtained from information of the rim diameter in a manner shown in Formula (4) below.

$\theta bcr\_RD$ (deg)$=Lbcr\_RD$ (mm)$\div(Db$ (inch)$\times 25.4 \times \pi) \times 360$    (4)

After the inter-two-point coordinate angle is thus calculated, a movement amount of the tire T, i.e., a rotation angle of the tire T has been rotated during application of a lubrication solution, is obtained from a rotation angle of the rotational roller 7.

First, before obtaining a rotation angle, it is necessary to correct a pulse count value measured by the pulse detector 25. Specifically, since in the two-dimensional code reader 24, time from completion of reading of a two-dimensional code until completion of data processing is a delay time, a pulse count value obtained by counting by the pulse detector 25 is corrected by obtaining the delay time. The delay time in the present embodiment is defined as a "decoding time". Notifying the controller 22 of a "decoding time" from the two-dimensional code reader 24 via the communication module 29 enables the controller 22 to correct the pulse count value by the delay time.

Specifically, since a pulse count value becomes larger than a correct value by the decoding time, a value corresponding to the decoding time is subtracted for the correction as shown in Formula (5) below. "C1" in Formula (5) represents the pulse count number actually measured in the first measurement and "C2" represents the pulse count number actually measured in the second measurement. In other words, "C2" can be also considered a pulse count number obtained when the tire T is further rotated than "C1".

When the lubrication operation starts in the lubrication unit 2, reading by the code reader is also started simultaneously with start of the rotation of the tire T. "The pulse count number actually measured in the first measurement" is a pulse count number measured first at a reference point after the tire T starts rotation, and "the pulse count number actually measured in the second measurement" is a pulse count number measured when the reference point again arrives at the position of the code reader after the first measurement, i.e. when the tire T makes one round from the first measurement.

A pulse count value (P_C1, P_C2) after the correction can be represented by Formula (5) below, where a delay time in the first pulse count is represented as "Ta", a delay time in the second pulse count as "Tb", and a time per one pulse as 7.4 ns.

P_C1 (number of pulses)=C1 (number of pulses)−
  (Ta (ns)÷7.4 (ns/number of pulses))

P_C2 (number of pulses)=C2 (number of pulses)−
  (Tb (ns)÷7.4 (ns/number of pulses))    (5)

When the first and second pulse count values in which delay time as a decoding time has been corrected are obtained according to Formula (5), next, calculation of the tire diameter is executed. Information of a tire diameter and a width direction included in a two-dimensional code are in general tire specification values and the diameter is often different from an actual tire diameter. Calculation using a specification value might cause an error in a position of a singular point. Therefore, a more precise value of a tire diameter Dta is calculated by repeating operation of, for example, calculating the tire diameter Dta from a transmitted tire diameter Dt and a pulse count value and again calculating the tire diameter Dta from the calculated tire diameter Dta and a pulse count value. First, a tire diameter is calculated from a pulse count value based on the transmitted tire diameter in a manner, for example, as shown below.

Figure 5:
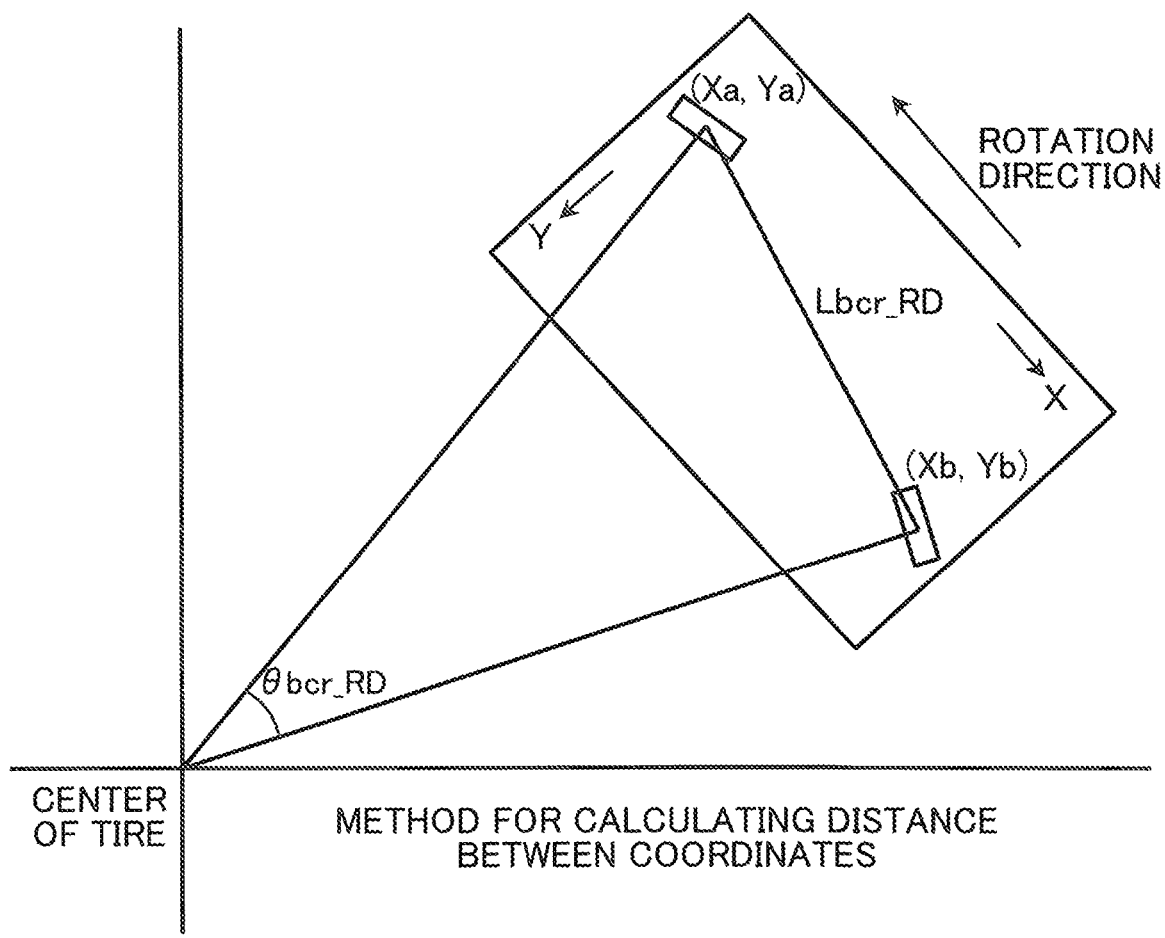
FIG. 5 is a diagram showing a concept of a method for calculating an inter two-point angle by the two-dimensional code reader.
Figure 6:
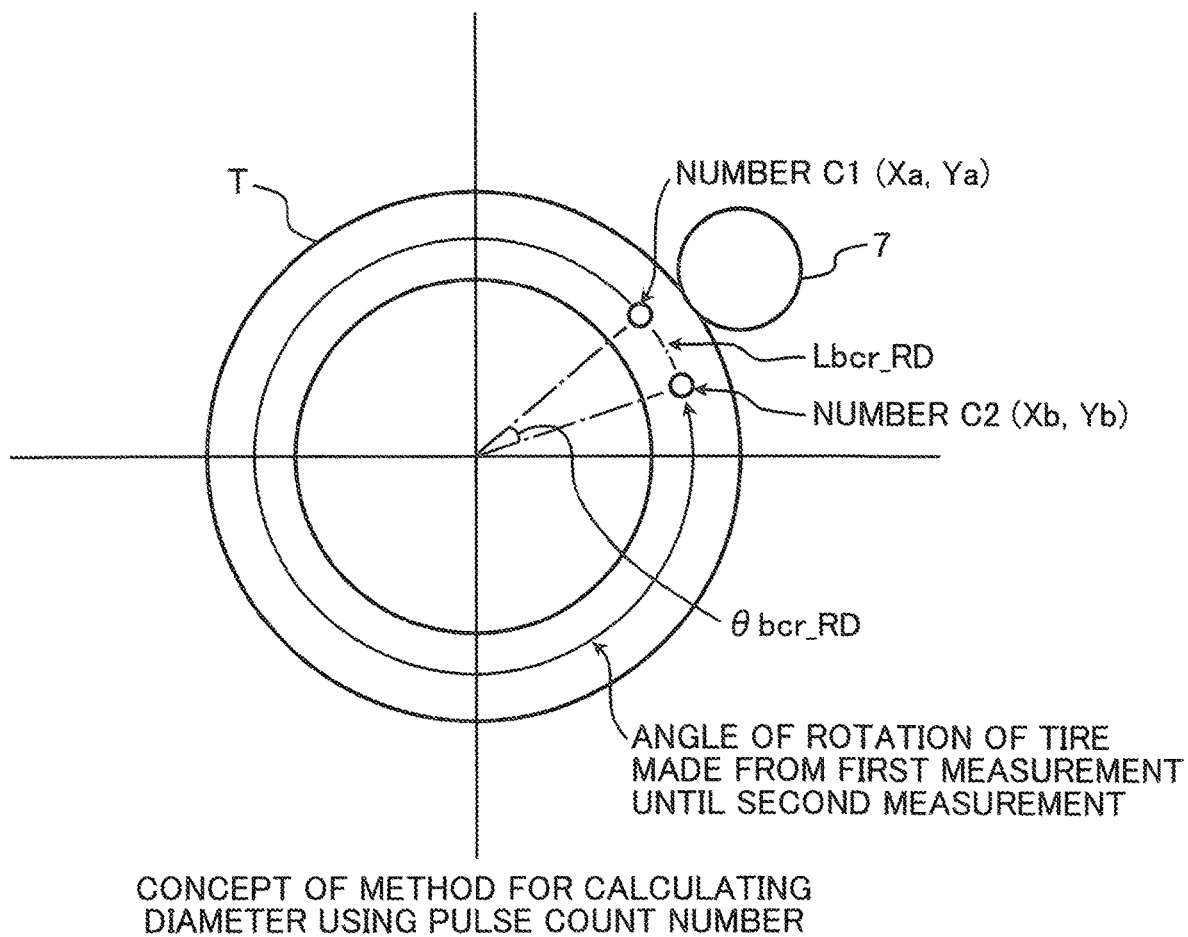
FIG. 6 is a diagram showing a concept of a method for calculating a tire diameter using a pulse counter.

An angle between inter-two-point coordinates ($\theta bcr\_RD$ (°)) is represented as shown in FIG. 5 and FIG. 6 based on a first detection result of a reference point and a second detection result of the reference point. Approximating the inter-two-point distance (Lbcr_RD (mm)) to a circular arc centered around the center of the tire T, the following Formula (6) is established.

$(\theta bcr\_RD \div 360) \times Dt \times \pi = Lbcr\_RD$    (6)

On the other hand, assuming that a pulse count corresponding to the inter two-point distance Lbcr_RD to be PulseCount_Ang (number of pulses), PulseCount_Ang is represented by the following Formula (7), where a tire diameter calculated from a pulse count value is represented as Dta (mm), a diameter of the roller 7 is represented as Dr (mm), and the number of pulses per one rotation of the roller 7 is 60 (number of pulses).

PulseCount_Ang$=(\pi \times Dta \times (\theta bcr\_RD \div 360)) \div (\pi \times Dr \div 60)$    (7)

Since in the present embodiment, the roller 7 has a diameter Dr of 114 mm, substituting this numerical value in the above Formula results in representing PulseCount_Ang by the following Formula (8).

PulseCount_Ang (number of pulses)$=\theta bcr\_RD \times Dta \div 684$    (8)

It is necessary to switch processing contents also depending on a position of read coordinate which is read at the second pulse count relative to read coordinate which is read at the first pulse count.

Specifically, in a case where the position of the read coordinate which is read at the second pulse count is on the front side, in other words, where the second read coordinate is positioned at the side opposite to the first read coordinate in a rotation direction of the tire T as shown in FIG. 6, since the tire T is yet to make full one round, it is necessary to make correction by adding the number of pulses between coordinates as shown in Formula (9) below.

Conversely, in a case where the position of the read coordinate which is read at the second pulse count is on the back side, in other words, where the second read coordinate is positioned ahead of the first read coordinate in the rotation direction of the tire T, since the pulse number is additionally counted, it is necessary to make correction by subtraction as shown in Formula (10) below. Here, PulseCount_RD in Formula (9) and Formula (10) represent the pulse count number (number of pulses) of one round of the tire.

In a case of Xb>Xa, $$\text{PulseCount\_RD}=(P\_C2-P\_C1)+\text{PulseCount\_Ang} \quad (9)$$

In a case of Xb<Xa, $$\text{PulseCount\_RD}=(P\_C2-P\_C1)-\text{PulseCount\_Ang} \quad (10)$$

When PulseCount_RD is thus obtained, the diameter Dta of the tire T is calculated by substituting the obtained PulseCount_RD in Formula (11) below. "Dr" in Formula (11) represents the diameter of the rotational roller 7. In the present embodiment, the pulse number per one rotation of the rotational roller 7 is, for example, 60 pulses (number of pulses).

$$Dta=(Dr \text{ (mm)}\div 60.0 \text{ (number of pulses)})\times \text{PulseCount\_RD} \quad (11)$$

In the above-described repeating operation, the operation is repeated of calculating Dta again, from the Dta calculated by Formula (11), using Formula (6), Formula (7), Formula (8), Formula (9) or Formula (10), and Formula (11).

After the rotation of the rotational roller 7 stops, when the arm 8 is driven to complete opening operation of the arm 8, calculation of a stop angle is executed using the tire diameter calculated according to the above procedure.

Calculation of a stop angle is as follows.

Specifically, calculation of the stop angle is conducted by using the pulse number from completion of the second reading of the coordinates until stop of rotation. First, a pulse number Cr counted from the completion of the second reading until stop of the rotation is shown by Formula (12) below. "C" in Formula (12) represents a pulse count number from the start of pulse counting until stop of the tire T. In Formula (12), a count number from the second reading until stop of the tire T is calculated by subtracting the pulse number "P_C2" at the second two-dimensional code reading from the pulse count number "C" counted from the start of counting until the stop of the tire T.

$$Cr=C \text{ (number of pulses)}-P\_C2 \text{ (number of pulses)} \quad (12)$$

Using the pulse number Cr, a roller rotation angle $\theta r$, and a tire rotation angle $\theta t$ can be represented as shown in Formula (13) below. "Pr" in Formula (13) represents a rotation angle per one pulse in the rotational roller 7 (e.g. 6 deg/pulse).

The roller rotation angle $\theta r$ (deg)=Cr (number of pulses)× Pr (deg/number of pulses)

$$\text{The tire rotation angle } \theta t \text{ (deg)}=(Dr \text{ (mm)}\div Dta \text{ (mm)})\times \theta r \text{ (deg)} \quad (13)$$

Figure 7:
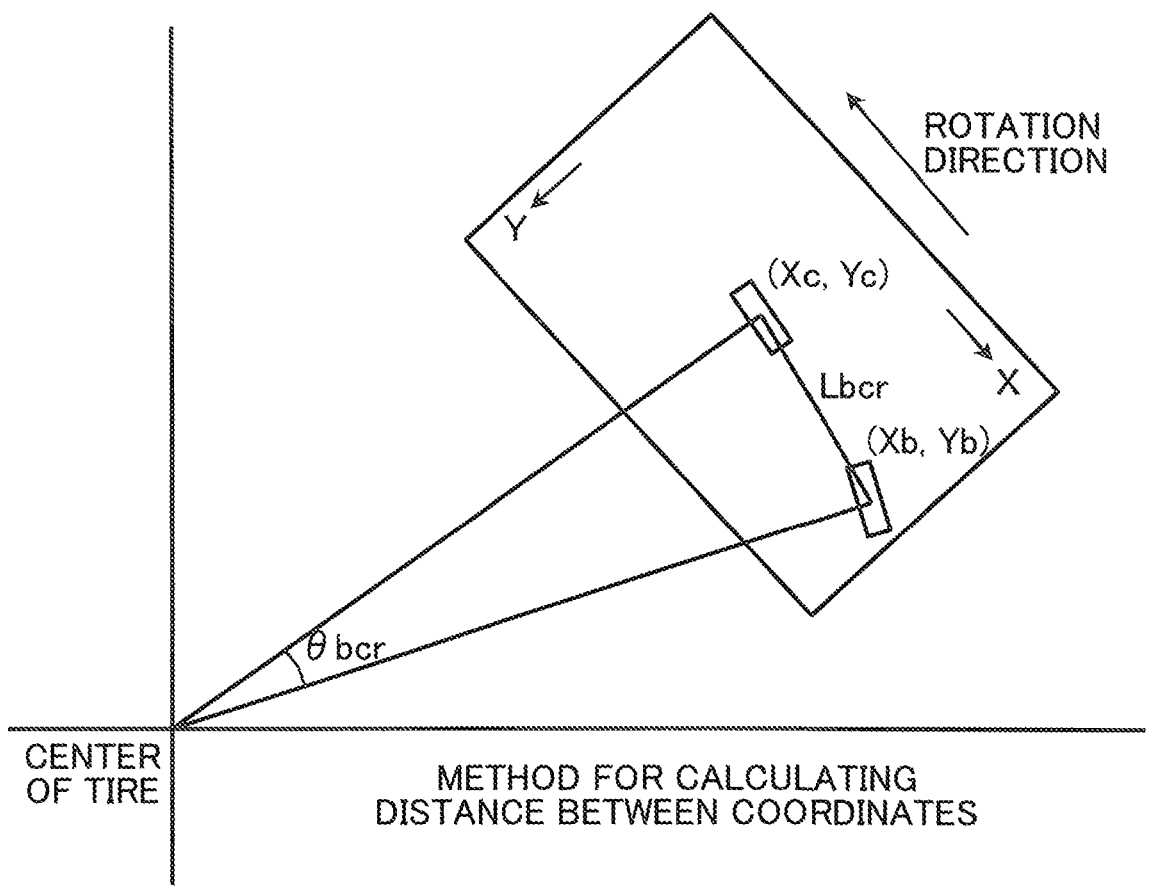
FIG. 7 is a diagram showing a concept of a method for calculating a stop angle in the lubrication unit by the two-dimensional code reader.

Next, a stop angle of the above-described two-dimensional bar code is calculated. First, as shown in FIG. 7, a distance, which is obtained from the center of the coordinates as a reference for a stop angle to the two-dimensional bar code, is represented by Formula (14) below.

Distance from a center of view of the bar code reader to a bar code detection position:

$$Lbcr \text{ (mm)}=\sqrt{[\{(Xc-Xb)\times Xp\}^2+\{(Yc-Yb)\times Yp\}^2]} \quad (14)$$

Using the distance Lbcr obtained by the above Formula (14), an angle of the bar code detection position with the center of view of the bar code reader as a reference is further calculated as shown in Formula (15) below.

Angle of the bar code detection position with the center of view of the bar code reader as a reference:

$$\theta bcr \text{ (deg)}=Lbcr \text{ (mm)}\div(Db \text{ (inch)}\times 25.4\times \pi)\times 360 \quad (15)$$

Next, as shown in FIG. 7, using the pulse count number, an angle until stop of the bar code is calculated. With an angle from the bar code reader 24 to a bar code stop position being represented as $\theta bc$, $\theta bc$ can be obtained as shown in Formula (16) below. Although the rotation of the tire T in the lubrication operation stops after the bar code is detected twice by the bar code reader, the stop position is a little past the position of the bar code reader. Therefore, in Formula (16), a difference between a position of the bar code reader and a position of the bar code when the tire T stops is calculated. It is, however, necessary to change the processing contents depending on a positional relation between Xb and Xc similarly to the case of the above-described FIG. 6.

In a case of Xb<Xc $$\theta bc=\theta t+\theta bcr$$

In a case of Xb≥Xc $$\theta bc=\theta t-\theta bcr \quad (16)$$

Next, for indicating the stop angle on a drum basis, bar code stop position correcting calculation is executed with the stop angle replaced by an angle on a drum basis. The correction calculation is as shown in Formula (17) below.

$$\theta \text{ (deg)}=\theta bc \text{ (deg)}-\theta b \text{ (deg)} \quad (17)$$

Figure 8:
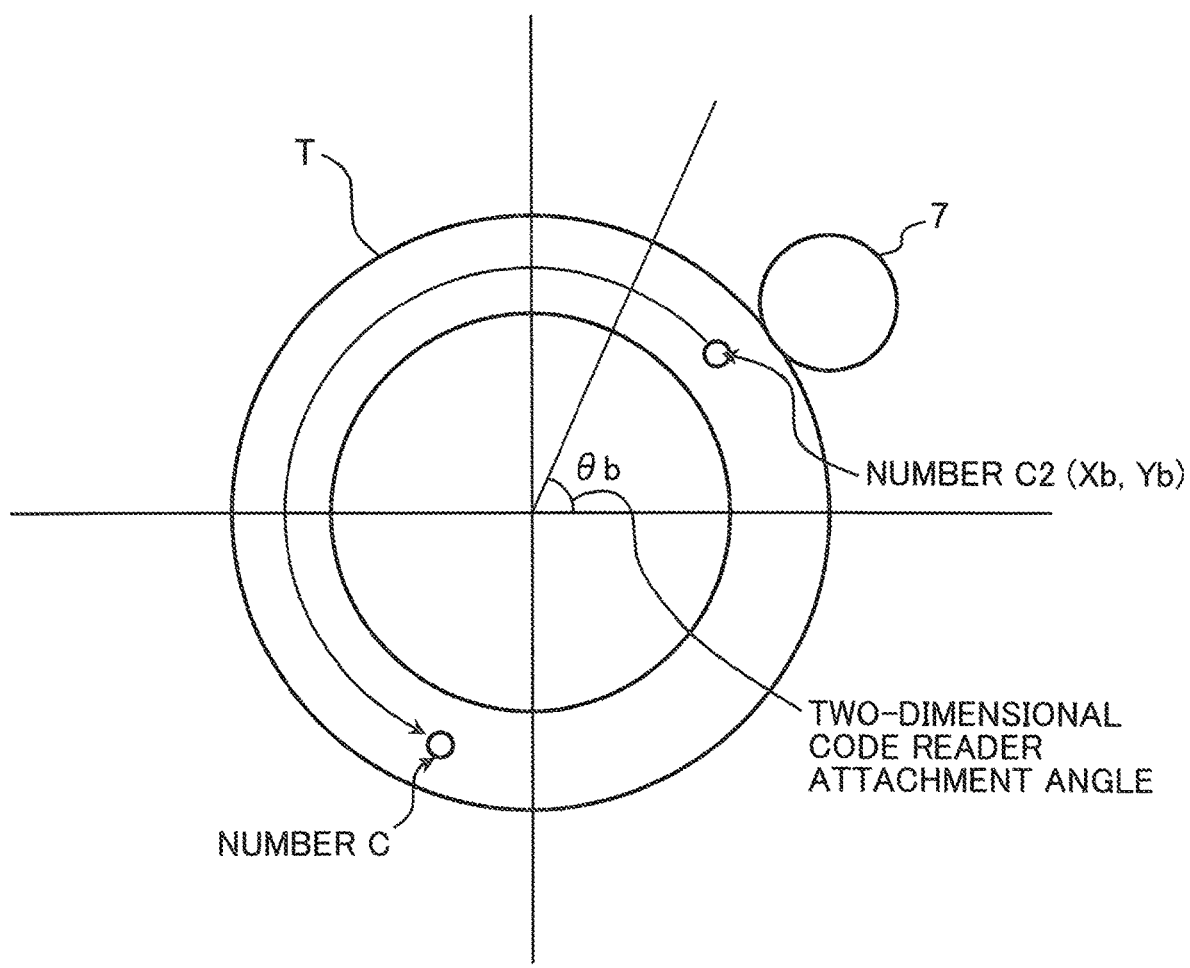
FIG. 8 is a diagram showing a concept of a method for calculating the tire diameter using the pulse counter

Lastly, surplus calculation is conducted such that the obtained angle falls within a range of 0° to 360°. "$\theta b$" in Formula (17) is determined by information of a rim and the like transmitted from the computer apparatus to the controller 22. Specifically, the rim information to be transmitted has such a value as indicated in "sensor position" in Table shown in FIG. 13. The sensor position corresponds to a two-dimensional code reader attachment angle as shown in FIG. 8.

Conducting the above-described correction method enables a position of a reference point to be obtained with high precision and enables a singular point angle based on a reference point to be calculated with high precision.

The embodiments disclosed herein are for illustrative purpose only and not to be construed limitative. In particular, in the embodiments disclosed herein, matters not explicitly disclosed, such as driving conditions, operation conditions, various kinds of parameters, and sizes, weights, and volumes of components, do not depart from a scope executed by an ordinary person in the art, and values that an ordinary person in the art can easily arrive at are adopted.

As described in the foregoing, there are provided a tire testing method and a tire testing device which enable a phase from a reference point of a tire to a singular point to be obtained with high precision and with inexpensive means without precisely positioning the reference point of the tire at a fixed position before detection of the singular point in a tire test, and also enable marking made at the singular point to be followed up.

The tire testing method to be provided includes: a step for applying a lubrication solution to a bead part of a tire provided with a reference point while rotating the tire; a step for detecting a phase of the reference point after application of the lubrication solution; a step for detecting a phase of a rotation origin of a spindle at common coordinates shared with coordinates at which the phase of the reference point is indicated; a step for detecting a singular point present on the tire by conducting a tire test while rotating, on the spindle, the tire to which the lubrication solution has been applied, and detecting a phase from the rotation origin to the singular point; a step for calculating a phase from the reference point to the singular point based on the phase of the reference point, the phase of the rotation origin, and the phase from the rotation origin to the singular point; a step for storing information about the reference point at the common coordinates and information about the rotation origin at the common coordinates; and a step for marking the tire at a position along a circumferential direction where the singular point is present.

By the tire testing method, a phase from a reference point of a tire to a singular point can be obtained with high precision and with inexpensive means without precisely positioning the reference point of the tire at a fixed position before detection of a singular point in a tire test, and also marking made at the singular point can be followed up. Specific contents are as follows.

In a case where a reference point of a tire is not precisely positioned at a fixed position before detection of a singular point in a tire test, since the step of applying a lubrication solution conducted before detection of a singular point involves rotation of the tire, the reference point of the tire is not positioned at a fixed position (fixed phase) and can assume an arbitrary position (arbitrary phase) after the application of a lubrication solution.

Similarly, in a case where a rotation origin of the spindle is not precisely positioned at a fixed position after detection of a singular point in a tire test, the rotation origin of the spindle is not positioned at a fixed position (fixed phase) and can assume an arbitrary position (arbitrary phase) at the completion of the tire test. Accordingly, at the start of the next tire test, the rotation origin of the spindle is not positioned at a fixed position (fixed phase).

In the tire testing method, therefore, a phase of a reference point of the tire is detected after the application of a lubrication solution and also a phase of the rotation origin of the spindle at common coordinates shared with coordinates at which the phase of the reference point is indicated is detected. As a result, the phase of the reference point and the phase of the rotation origin are correlated at the common coordinates, so that a difference can be obtained between the phase of the reference point and the phase of the rotation origin. Then, in the tire testing method, a singular point present on the tire is detected and a phase from the rotation origin of the spindle to the singular point is detected. From thus obtained phase from the rotation origin to the singular point and the above-described difference between the phase of the reference point and the phase of the rotation origin, a phase from the reference point to the singular point can be calculated.

Accordingly, in the tire testing method, a phase from a reference point of the tire to a singular point can be obtained with high precision without precisely positioning a reference point of the tire at a fixed position before detection of a singular point in a tire test. As a result, in the tire testing method, use of complicated and expensive parts such as servo motors is not required for precisely positioning a reference point of a tire as disclosed, for example, in Patent Literature 1. Additionally, if a servo motor is used, a lot of complicated control instructions by a controller are generated to result in increasing the number of processings accordingly and making the control very complicated. Such a problem does not occur in the tire testing method.

Further, in the tire testing method, since information about the reference point at the common coordinates and information about the rotation origin at the common coordinate are stored, follow-up can be conducted whether a marking has been impressed on a singular point after manufacturing or not in a case of an unforeseen situation.

In the tire testing method, the reference point may be formed of a two-dimensional code impressed on the tire.

Also, it is preferable that the two-dimensional code includes information about a diameter and a width direction of the tire, and that the singular point is detected using the information about a diameter and a width direction of the tire obtained from the two-dimensional code.

In the step for detecting the phase of the reference point, the two-dimensional code is preferably read using a two-dimensional code reader.

Also, the two-dimensional code reader may have a view range wider than the two-dimensional code, and preferably in the step of detecting the phase of the reference point, the two-dimensional code reader inputs, to a controller, position data of the two-dimensional code within the view range in the two-dimensional code reader, and the controller corrects a phase of the two-dimensional code at the common coordinates based on the position data of the two-dimensional code, so that the corrected phase of the two-dimensional code is considered as a phase of the reference point.

Additionally, the tire testing device includes: a lubrication unit which applies a lubrication solution to a bead part of a tire provided with a reference point while rotating the tire; a main body unit which detects a singular point present on the tire by conducting a tire test while rotating, on a spindle, the tire to which the lubrication solution has been applied by the lubrication unit; a marking unit which marks the tire at a position along a circumferential direction where the singular point is present; a singular point phase calculating unit; and a storage unit. The lubrication unit has a reference point phase detecting unit which detects a phase of the reference point after application of the lubrication solution, the phase of the reference point being a phase at common coordinates which are common to the lubrication unit, the main body unit, and the marking unit. The main body unit has an origin phase detecting unit which detects a phase of a rotation origin of the spindle at the common coordinates, and a singular point phase detecting unit which detects a phase from the rotation origin to the singular point. The singular point phase calculating unit is configured to calculate a phase from the reference point to the singular point based on the phase of the reference point detected by the reference point phase detecting unit, the phase of the rotation origin detected by the origin phase detecting unit, and the phase from the rotation origin to the singular point detected by the singular point phase detecting unit. The storage unit is configured to store information about the reference point at the common coordinates detected by the reference point phase detecting unit and information about the rotation origin at the common coordinates detected by the origin phase detecting unit.

In the tire testing device, a phase from a reference point of the tire to a singular point can be obtained with high precision without precisely positioning a reference point of the tire at a fixed position before detection of a singular point in a tire test. As a result, in the tire testing device, use of complicated and expensive parts such as servo motors is not required for precisely positioning a reference point of a tire as disclosed, for example, in Patent Literature 1.

Further, in the tire testing device, based on the information stored in the storage unit, i.e. information about the reference point at the common coordinates, and information about the rotation origin at the common coordinate, follow-up can be conducted whether a marking has been impressed on a singular point or not in a case of an unforeseen situation after manufacturing.

In the tire testing device, the reference point may be formed of a two-dimensional code impressed on the tire, and the lubrication unit may have a two-dimensional code reader which reads the two-dimensional code.

Also, the tire testing device may further includes a reference point phase calculating unit. The reference point phase detecting unit may have a position detecting unit which detects a position of the reference point and an angle detecting unit which detects a rotation angle of the tire having been rotated. The reference point phase calculating unit may be configured to calculate the phase of the reference point of the tire after the application of the lubrication solution based on a position of the reference point of the tire at the common coordinates detected by the position detecting unit during the application of the lubrication solution and based on a rotation angle of the tire detected by the angle detecting unit during the application of the lubrication solution.

In this manner, a phase of a reference point of a tire after application of a lubrication solution can be calculated based on a position of the reference point of the tire detected by the position detecting unit during the application of the lubrication solution and based on a rotation angle of the tire detected by the angle detecting unit during the application of the lubrication solution.

While in the technique disclosed in Patent Literature 1, control of a rotation mechanism is conducted by detection of a mark by a mark detection position sensor, it is unknown which part of the mark was detected by the mark detection position sensor. Accurate calculation of a rotation direction angle of a singular point with high precision is therefore difficult. By contrast, the above-described embodiments enable accurate calculation of a rotation direction angle of a singular point with high precision because the correction step is conducted.

The invention claimed is:

1. A tire testing method comprising:
a step for applying a lubrication solution to a bead part of a tire provided with a reference point while rotating the tire;
a step for detecting a phase of the reference point after application of the lubrication solution;
a step for detecting a phase of a rotation origin of a spindle at common coordinates shared with coordinates at which the phase of the reference point is indicated, the rotation origin being an origin capable of assuming various directions relative to a rotation axis of the spindle;
a step for detecting a singular point present on the tire by conducting a tire test while rotating, on the spindle, the tire to which the lubrication solution has been applied, and detecting a phase from the rotation origin to the singular point;
a step for calculating a phase from the reference point to the singular point based on the phase of the reference point, the phase of the rotation origin, and the phase from the rotation origin to the singular point;
a step for storing information about the reference point at the common coordinates and information about the rotation origin at the common coordinates; and
a step for marking the tire at a position along a circumferential direction where the singular point is present.

2. The tire testing method according to claim 1, wherein the reference point is formed of a two-dimensional code impressed on the tire.

3. The tire testing method according to claim 2, wherein in the step for detecting the phase of the reference point, the two-dimensional code is detected using a two-dimensional code reader.

4. The tire testing method according to claim 3, wherein
the two-dimensional code reader has a view range wider than the two-dimensional code, and
in the step of detecting the phase of the reference point, the two-dimensional code reader inputs, to a controller, position data of the two-dimensional code within the view range in the two-dimensional code reader, and the controller corrects a phase of the two-dimensional code at the common coordinates based on the position data of the two-dimensional code, so that the corrected phase of the two-dimensional code is considered as the phase of the reference point.

5. The tire testing method according to claim 3, wherein
the two-dimensional code reader has a view range wider than the two-dimensional code, and
in the step of detecting the phase of the reference point, the two-dimensional code reader inputs, to a controller, position data of the two-dimensional code within the view range in the two-dimensional code reader, a pulse detector inputs, to the controller, a delay time from completion of reading of the two-dimensional code until completion of data processing, and the controller corrects a phase of the two-dimensional code at the common coordinates based on the position data of the two-dimensional code and the delay time, so that the corrected phase of the two-dimensional code is considered as the phase of the reference point.

6. A tire testing device comprising:
a lubrication unit which applies a lubrication solution to a bead part of a tire provided with a reference point while rotating the tire;
a main body unit which detects a singular point present on the tire by conducting a tire test while rotating, on a spindle, the tire to which the lubrication solution has been applied by the lubrication unit;
a marking unit which marks the tire at a position along a circumferential direction where the singular point is present;
a singular point phase calculating unit; and
a storage unit, wherein
the lubrication unit has a reference point phase detecting unit which detects a phase of the reference point after application of the lubrication solution, the phase of the reference point being a phase at common coordinates which are common to the lubrication unit, the main body unit, and the marking unit,
the main body unit has an origin phase detecting unit which detects a phase of a rotation origin of the spindle at the common coordinates, and a singular point phase detecting unit which detects a phase from the rotation origin to the singular point, the rotation origin being an origin capable of assuming various directions relative to a rotation axis of the spindle,
the singular point phase calculating unit is configured to calculate a phase from the reference point to the singular point based on the phase of the reference point detected by the reference point phase detecting unit, the phase of the rotation origin detected by the origin phase detecting unit, and the phase from the rotation origin to the singular point detected by the singular point phase detecting unit, and the storage unit is configured to store information about the reference point at the common coordinates detected by the reference point phase detecting unit and information about the rotation origin at the common coordinates detected by the origin phase detecting unit.

7. The tire testing device according to claim 6, wherein the reference point is formed of a two-dimensional code impressed on the tire, and the lubrication unit has a two-dimensional code reader which reads the two-dimensional code.

8. The tire testing device according to claim 6, further comprising a reference point phase calculating unit, wherein the reference point phase detecting unit has a position detecting unit which detects a position of the reference point and an angle detecting unit which detects a rotation angle of the tire having been rotated, and the reference point phase calculating unit is configured to calculate the phase of the reference point of the tire after the application of the lubrication solution based on a position of the reference point of the tire at the common coordinates detected by the position detecting unit during the application of the lubrication solution and a rotation angle of the tire detected by the angle detecting unit during the application of the lubrication solution.

9. The tire testing device according to claim 7, further comprising a reference point phase calculating unit, wherein the reference point phase detecting unit has a position detecting unit which detects a position of the reference point and an angle detecting unit which detects a rotation angle of the tire having been rotated, and the reference point phase calculating unit is configured to calculate the phase of the reference point of the tire after the application of the lubrication solution based on a position of the reference point of the tire at the common coordinates detected by the position detecting unit during the application of the lubrication solution and a rotation angle of the tire detected by the angle detecting unit during the application of the lubrication solution.

* * * * *